United States Patent [19]
Hunt et al.

[11] Patent Number: 5,232,206
[45] Date of Patent: Aug. 3, 1993

[54] ELEVATOR AIR JACK

[76] Inventors: El-Verneice P. Hunt, 4100 E. 187th St. #120, Cleveland, Ohio 44122; George Spector, 233 Broadway Rm. 702, New York, N.Y. 10279

[21] Appl. No.: 906,058

[22] Filed: Jun. 29, 1992

[51] Int. Cl.⁵ .............................................. B66F 3/24
[52] U.S. Cl. ................................................... 254/423
[58] Field of Search ................... 254/423, 93 R, 93 H, 254/45

[56] References Cited

U.S. PATENT DOCUMENTS

| | | | |
|---|---|---|---|
| 3,749,363 | 7/1973 | Hauser | 254/45 |
| 3,945,610 | 3/1976 | Solie et al. | 254/93 R |
| 4,061,309 | 12/1977 | Hanser | 254/423 |

*Primary Examiner*—Robert C. Watson

[57] ABSTRACT

An air jack assembly is provided for a motor vehicle which consists of a cylinder mounted vertically to the underside of a chassis of the motor vehicle approximate a ground engaging wheel of the motor vehicle, with the cylinder having a reciprocal piston rod extendable and retractable longitudinally therefrom. A horizontally disposed ground engagable base plate is secured to a distal end of the piston rod. A mechanism is carried by the motor vehicle, for moving the piston rod longitudinally from the cylinder, to lower the base plate to the ground and raise the chassis of the motor vehicle, so that the wheel will lift off the ground. Another mechanism is carried by the motor vehicle, for moving the piston rod longitudinally into the cylinder, to raise the base plate off the ground and lower the chassis of the motor vehicle, so that the wheel will engage the ground again.

2 Claims, 1 Drawing Sheet

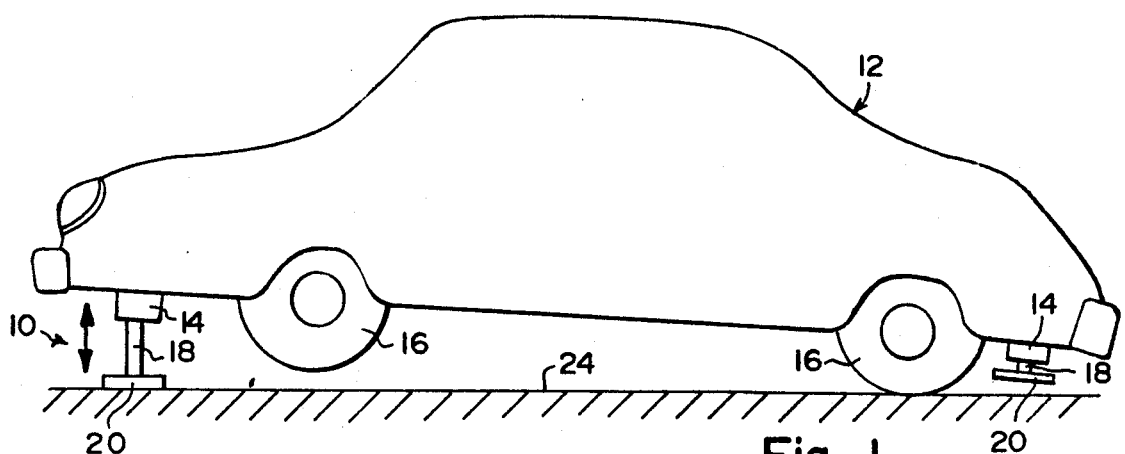
Fig. 1
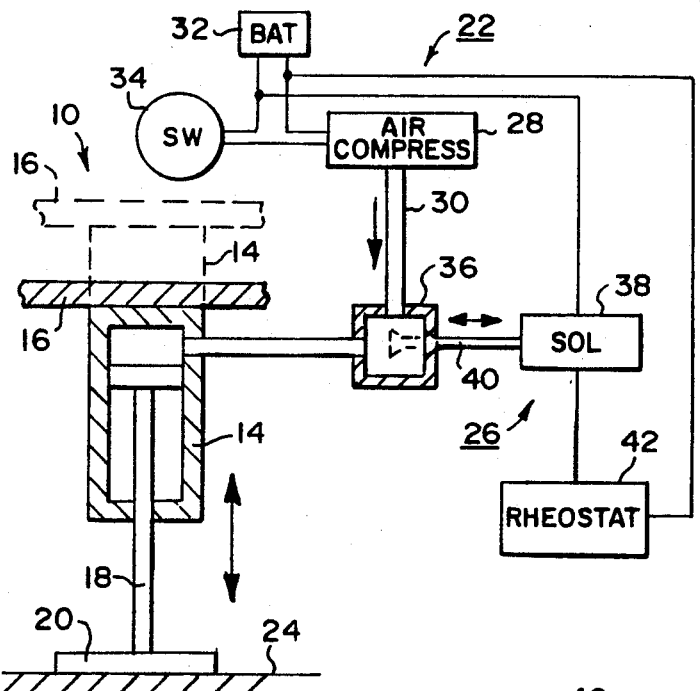
Fig. 2
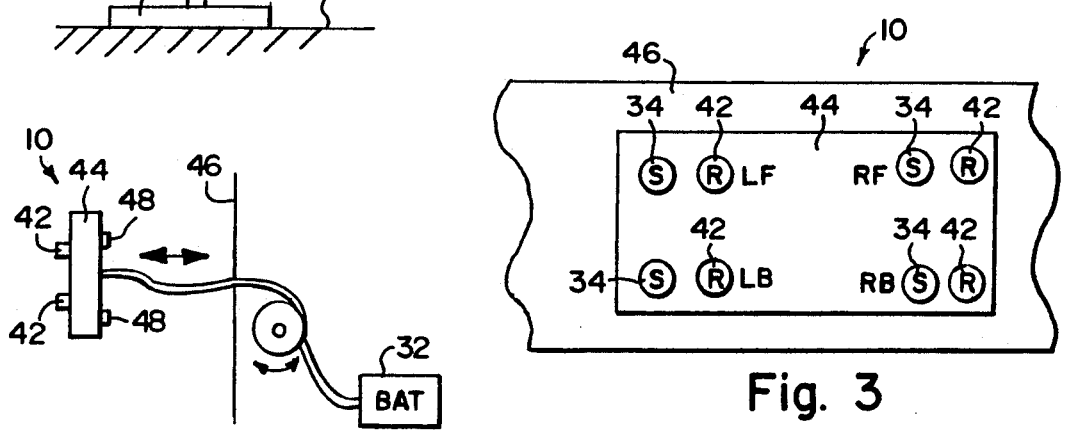
Fig. 3
Fig. 4

ELEVATOR AIR JACK

BACKGROUND OF THE INVENTION

The instant invention relates generally to hydraulic lift mechanisms and more specifically it relates to an air jack assembly for a motor vehicle which provides an air pressure actuated mechanism attached to the frame of the motor vehicle for lifting the wheels off the ground.

There are available various conventional hydraulic lift mechanisms which do not provide the novel improvements of the invention herein disclosed.

SUMMARY OF THE INVENTION

A primary object of the present invention is to provide an air jack assembly for a motor vehicle that will overcome the shortcomings of the prior art devices.

Another object is to provide an air jack assembly for a motor vehicle that is a compressed air actuated mechanism attached to the chassis of the motor vehicle for lifting the wheels of the motor vehicle off the ground, so that the tires can be changed and repaired.

An additional object is to provide an air jack assembly for a motor vehicle in which the compressed air actuated mechanism can be controlled and operated from within the motor vehicle or from outside of the motor vehicle.

A further object is to provide an air jack assembly for a motor vehicle that is simple and easy to use.

A still further object is to provide a air jack assembly for a motor vehicle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a diagrammatic side view of a motor vehicle with the invention installed thereon and lifting up the front end of the motor vehicle.

FIG. 2 is a diagrammatic schematic view showing the components of one unit of the air jack assembly.

FIG. 3 is a front view of a portion of the dashboard showing control panel with switch buttons for operating all of the units of the air jack assembly mounted thereon, for easy operation by a person within the motor vehicle.

FIG. 4 is a diagrammatic side view showing a removable control panel from the dashboard, so that a person can operate the air jack assembly units from outside of the motor vehicle.

DETAILED DESCRIPTION OF THE PREFERRED EMBODIMENTS

Turning now descriptively to the drawings, in which similar reference characters denote similar elements throughout the several views, the Figures illustrate an air jack assembly 10 for a motor vehicle 12, which consists of a cylinder 14 mounted vertically to the underside of a chassis 16 of the motor vehicle 12 approximate a ground engaging wheel 16 of the motor vehicle 12, with the cylinder 14 having a reciprocal piston rod 18 extendable and retractable longitudinally therefrom. A horizontally disposed ground engagable base plate 20 is secured to a distal end of the piston rod 18. A mechanism 22 is carried by the motor vehicle 12, for moving the piston rod 18 longitudinally from the cylinder 14, to lower the base plate 20 to the ground 24 and raise the chassis 16 of the motor vehicle 12, so that the wheel 16 will lift off the ground 24. Another mechanism 26 is carried by the motor vehicle 12, for moving the piston rod 18 longitudinally into the cylinder 14, to raise the base plate 20 off the ground 24 and lower the chassis 16 of the motor vehicle 12, so that the wheel 16 will engage the ground 24 again.

The first moving mechanism 22 includes an air compressor 28 having a line 30 in communication with the cylinder 14. A battery 32 is electrically connected to the air compressor 28. A switch 34 is electrically connected between the air compressor 28 and the battery 32 to operate the air compressor 28.

The second moving mechanism 26 includes an air release valve 36 connected into the line 30 between the air compressor 28 and the cylinder 14. A solenoid 38 is mechanically connected at 40 to the air release valve 36. A rheostat 42 is electrically connected between the solenoid 38 and the battery 32 to adjustably control the solenoid 38, so that the solenoid 38 can adjustably operate the air release valve 36.

The air jack assembly 10 further includes a control panel 44 with the switch 34 of the first moving mechanism 32 and the rheostat 42 of the second moving mechanism 26 connected thereto. As shown in FIG. 3, the control panel 44 can be mounted onto the dashboard 46, to allow a person to operate the switch 34 and the rheostat 42 from within the motor vehicle 12. As shown in FIG. 4, the control panel 44 can be removed from the dashboard 46 via magnets 48 or the like to allow a person to operate the switch 34 and the rheostat 42 outside of the motor vehicle 12.

The control panel 44 can also be mounted within the motor vehicle 12 adjacent a side window for external operation. The control panel 44 can also be mounted within the trunk or have an extension cord that can plug into the dashboard 46.

The air jack assembly 10 can be two units in which one can be mounted to the front and the other mounted to the back of the chassis 16 of the motor vehicle 12. The air jack assembly 10 can also be four units in which each one can be mounted to the chassis of the motor vehicle 12 adjacent each wheel 16. The control panel 44, as shown in FIG. 3, will contain the respective switches 34 and rheostats 42 to individually operate the four units therefrom.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An air jack assembly for a motor vehicle which comprises:

a) a cylinder mounted vertically on the underside of a chassis of the motor vehicle approximate a ground engaging wheel of a motor vehicle, with said cylinder having a reciprocal piston rod extendable and retractable longitudinally therefrom;

b) a horizontally disposed ground engagable base plate secured to a distal end of said piston rod;

c) a first moving means carried by the motor vehicle, for moving said piston rod longitudinally from said cylinder, to lower said base plate to the ground and raise the chassis of the motor vehicle, so that the wheel will lift off the ground; and d) a second moving means carried by the motor vehicle, for moving said piston rod longitudinally into said cylinder, to raise said base plate off the ground and lower the chassis of the motor vehicle, so that the wheel will engage the ground again; wherein said first moving means includes:

e) an air compressor having a line in communication with said cylinder above said piston;

f) a battery electrically connected to said air compressor;

g) a switch electrically connected between said air compressor and said battery to operate said air compressor; wherein said second moving means includes:

h) an air release valve box connected with said line between said air compressor and said cylinder;

i) a solenoid mechanically connected to said air release valve box;

j) a valve mounted in said box having a stem operated by said solenoid and;

k) a rheostat electrically connected between said solenoid and said battery to adjustably control said solenoid, so that said solenoid can adjustably operate said air release valve.

2. An air jack assembly for a motor vehicle as recited in claim 1, further including a control panel with said switch of said first moving means and said rheostat of said second moving means connected thereto, so that in a first instance said control panel can be mounted onto the dashboard to allow a person to operate the switch and rheostat from within the motor vehicle and in a second instance the control panel can be removed from the dashboard to allow a person to operate the switch and the rheostat outside of the motor vehicle.

* * * * *